(12) United States Patent
Wu

(10) Patent No.: US 9,654,466 B1
(45) Date of Patent: May 16, 2017

(54) METHODS AND SYSTEMS FOR ELECTRONIC TRANSACTIONS USING DYNAMIC PASSWORD AUTHENTICATION

(71) Applicant: CITIGROUP TECHNOLOGY, INC., Weehawken, NJ (US)

(72) Inventor: Frank L. Wu, Wayne, NJ (US)

(73) Assignee: CITIGROUP TECHNOLOGY, INC., Weehawken, NJ (US)

( * ) Notice: Subject to any disclaimer, the term of this patent is extended or adjusted under 35 U.S.C. 154(b) by 0 days.

(21) Appl. No.: 13/867,228

(22) Filed: Apr. 22, 2013

Related U.S. Application Data

(60) Provisional application No. 61/652,422, filed on May 29, 2012.

(51) Int. Cl.
H04L 29/06 (2006.01)

(52) U.S. Cl.
CPC ...... *H04L 63/0838* (2013.01); *H04L 63/0428* (2013.01); *H04L 63/0853* (2013.01); *H04L 63/10* (2013.01); *H04L 63/12* (2013.01)

(58) Field of Classification Search
CPC . H04L 63/0838; H04L 63/0853; H04L 63/10; H04L 63/12; H04L 63/0428
See application file for complete search history.

(56) References Cited

U.S. PATENT DOCUMENTS

| | | | | |
|---|---|---|---|---|
| 8,627,424 | B1* | 1/2014 | O'Malley | G06F 21/335 370/254 |
| 9,306,943 | B1* | 4/2016 | Bailey | H04L 63/0853 |
| 2002/0007452 | A1* | 1/2002 | Traw et al. | 713/152 |
| 2002/0198848 | A1* | 12/2002 | Michener | G06Q 20/04 705/75 |
| 2004/0177047 | A1* | 9/2004 | Graves et al. | 705/71 |
| 2006/0036857 | A1* | 2/2006 | Hwang | 713/168 |
| 2006/0117175 | A1* | 6/2006 | Miura et al. | 713/155 |
| 2007/0250920 | A1* | 10/2007 | Lindsay | G06F 21/31 726/7 |
| 2008/0072061 | A1* | 3/2008 | Cannon | G06F 21/34 713/185 |
| 2009/0282258 | A1* | 11/2009 | Burke | G06F 21/31 713/184 |
| 2009/0300364 | A1* | 12/2009 | Schneider | 713/178 |
| 2009/0310779 | A1* | 12/2009 | Lam et al. | 380/46 |
| 2012/0021724 | A1* | 1/2012 | Olsen et al. | 455/411 |
| 2012/0272067 | A1* | 10/2012 | Jaquet-Chiffelle | G06F 21/34 713/183 |

* cited by examiner

*Primary Examiner* — Robert Leung
(74) *Attorney, Agent, or Firm* — John M. Harrington, Esq.; Johnson, Marcou & Isaacs, LLC

(57) ABSTRACT

Methods and systems for performing electronic transactions using dynamic password authentication involve, for example, sending, using a backend processor, a unique random or pseudorandom character string to the user's mobile device processor. Thereafter, also using the backend processor, a user identifier and a challenge string consisting at least in part of the user identifier and the random or pseudorandom character string encrypted with a unique encryption key may be received from the user's mobile device processor. Using the backend processor, a cipher input consisting at least in part of the user identifier and the random or pseudorandom character string is encrypted with the unique encryption key. The received encrypted challenge string is authenticated if the received encrypted challenge string matches the encrypted cipher input.

19 Claims, 11 Drawing Sheets

FOR THE SAME USER ID: GETRICH

EXAMPLE-1:
RANDOM CHARACTER: AJTV
128 BITS AES ENCRYPTION OUTPUT (BASE 64 ENCODED OUT FOR READABILITY):
K1KOX8MSGT26Y9TOZQFUSA==
ONETIME PASSWORD (SHORT HASH RESULT USE ADLER 32 HASH): 5EE707B3

EXAMPLE-2:
RANDOM CHARACTER: RSPW
128 BITS AES ENCRYPTION OUTPUT (BASE 64 ENCODED OUT FOR READABILITY):
RP9TJYN9JMA2G4+VNYCVPA==
ONETIME PASSWORD (SHORT HASH RESULT USE ADLER 32 HASH): 5EE2076B

EXAMPLE-3:
RANDOM CHARACTER: QSPW
128 BITS AES ENCRYPTION OUTPUT (BASE 64 ENCODED OUT FOR READABILITY):
MDY8WVMGLVU6AX+IMR35DA==
ONETIME PASSWORD (SHORT HASH RESULT USE ADLER 32 HASH): 69C507C4

Fig. 7

METHODS AND SYSTEMS FOR ELECTRONIC TRANSACTIONS USING DYNAMIC PASSWORD AUTHENTICATION

PRIORITY APPLICATION

This application claims the benefit of U.S. Provisional Application No. 61/652,422 filed May 29, 2012 entitled "METHODS AND SYSTEMS FOR ELECTRONIC TRANSACTIONS USING DYNAMIC PASSWORD AUTHENTICATION" and incorporated herein by this reference.

FIELD OF THE INVENTION

The present invention relates generally to the field of electronic transactions, and more particularly to methods and systems for performing electronic transactions using dynamic password authentication.

BACKGROUND OF THE INVENTION

Recent guidance from the Federal Financial Institutions Examination Council (FFIEC) requires financial institutions to employ a strong, multifactor authentication to protect its customers and clients for online transactions. Such guidance triggered many creative approaches, including combinations of knowledge based and machine tagging techniques.

The most common method to authenticate a user to a banking application relies on user identifier, also referred to herein as "user ID", and password. However, static passwords have limited security measures due to their inherent weakness including, for example, using easy-to-guess passwords, writing down passwords, and using the same password for various services without differentiating the service type or the service organization's reputation. To counter the weakness of static passwords, many organizations have deployed technology that uses a hardware or software token which generates a new random number within a fixed time interval, such as 60 seconds. In addition to having a significant cost factor, such technology also presents problems for customers who have multiple accounts at various organizations requiring them to carry multiple tokens. A phone-based Short Message Service (SMS) solution based one-time password authentication is popular, but it suffers from turnaround speed and constraints related to mobile signal strength.

There is a present need for a solution that resolves all of the foregoing issues in an end-to-end approach for providing, for example, a dynamic password user authentication that is natural and convenient to a user, while providing much higher authentication security than is currently available.

SUMMARY OF THE INVENTION

Embodiments of the invention employ computer hardware and software, including, without limitation, one or more processors coupled to memory and non-transitory computer-readable storage media with one or more executable computer application programs stored thereon which instruct the processors to perform the methods and systems for performing electronic transactions using dynamic password authentication described herein. It is to be understood that the term "processor" as used herein, either standing alone or in combination, refers to a computer processor. It is to be further understood that the term "application" as used herein, either standing alone or in combination, refers to a computer application executing or executable on a processor coupled to memory.

The methods and systems for performing electronic transactions using dynamic password authentication for embodiments of the invention may involve, for example, sending, using a backend processor, a unique random or pseudorandom character string to the user's mobile device processor; receiving, using the backend processor, a user identifier and a challenge string consisting at least in part of the user identifier and the random or pseudorandom character string encrypted with the unique encryption key from the user's mobile device processor; encrypting, using the backend processor, a cipher input with the unique encryption key sent to the user's mobile device processor, the cipher input consisting at least in part of the user identifier and the random or pseudorandom character string; and authenticating, using the backend processor, the received encrypted challenge string when the received encrypted challenge string matches the encrypted cipher input.

In aspects of embodiments of the invention, sending the unique encryption key to the user's mobile device processor may involve, for example, sending the unique encryption key to a mobile application installed on the user's mobile device. In other aspects, sending the unique encryption key to the mobile application may involve, for example, registering the mobile application with the backend processor. In further aspects, registering the mobile application may involve, for example, verifying an activation code received by the backend processor from the mobile device processor. In additional aspects, registering the mobile application may involve, for example, verifying user account information and the activation code received by the backend processor from the mobile device processor.

In other aspects of embodiments of the invention, sending the unique encryption key to the user's mobile device processor may involve, for example, sending a unique symmetric encryption key to the mobile application. In further aspects, sending the unique encryption key to the user's mobile device processor may involve, for example, storing the unique encryption key in a key store of the user's mobile device. In additional aspects, sending the unique encryption key to the user's mobile device processor may involve, for example, storing the unique encryption key in a key database by the backend processor. In still other aspects, storing the unique encryption key by the backend processor may involve, for example, associating the unique encryption key with the user identifier.

In further aspects of embodiments of the invention, prompting the random or pseudorandom character string may involve, for example, prompting the random or pseudorandom character string of less than eight characters to the user's mobile device processor. In still further aspects, prompting the random or pseudorandom character string may involve, for example, prompting the random or pseudorandom character string in response to a user's logon request.

In additional aspects of embodiments of the invention, receiving the user identifier and the encrypted challenge string may involve, for example, receiving a user PIN code and the encrypted challenge string consisting at least in part of the user PIN code and the random or pseudorandom character string encrypted with the unique encryption key from the user's mobile device processor. In further aspects, receiving the user identifier and the encrypted challenge string may involve, for example, receiving the user identifier and a one-time user password consisting of a hash of the encrypted challenge string. In other aspects, receiving the user identifier and one-time user password consisting of the hash of the encrypted challenge string may involve, for example, receiving the user identifier and the one-time user password consisting of a hash of a pre-determined number of characters of the encrypted challenge string. In still other aspects, receiving the user identifier and the one-time user password consisting of the hash of the pre-determined number of characters may involve, for example, receiving the user identifier and the one-time user password consisting of the hash of the encrypted challenge string that is not greater than eight characters.

In still further aspects of embodiments of the invention, encrypting the cipher input may involve, for example, retrieving the unique encryption key corresponding to the received user identifier from a key database by the backend processor. In other aspects, encrypting the cipher input may involve, for example, encrypting the cipher input consisting at least in part of a user PIN code and the random or pseudorandom character string prompted to the user's mobile device processor. In additional aspects, authenticating the received encrypted challenge string may involve, for example, comparing the received encrypted challenge string with the encrypted cipher input. Still other aspects of embodiments of the invention may involve, for example, prompting, on a succeeding occasion, a different random or pseudorandom character string to the user's mobile device processor.

Thus, embodiments of the invention provide methods and systems for performing electronic transactions using dynamic password authentication that may utilize a mobile application as a second authentication factor when a user authenticates to an online application. Such embodiments may employ a uniquely assigned encryption key installed in the mobile application during its registration and activation. The encryption key is unique and known only to the bank. Once installed and activated, the mobile application becomes a one-time password generator. The bank can verify the customer's identity by performing the same calculation to generate a password to compare to the one-time password entered by the user.

In aspects of embodiments of the invention, a mobile user may be pointed to a download site after properly authenticating to a financial institution, such as a bank, via an online banking application to receive an activation code for use during registration and activation. Alternatively, the bank may send the activation code to the user by some other channel, such as postal service. The mobile user may install a mobile application on his or her mobile device, and upon completion of installation, the mobile application may register to a back end banking application. The registration process may require the mobile user to provide his or her account information and the activation code.

In other aspects of embodiments of the invention, the backend banking application may receive and verify the activation code. Once the activation code and the account information are verified, the banking application may assign a unique encryption key, such as a unique 128-bit symmetric encryption key, to the mobile application. The mobile application may store the symmetric key in its key store, which key store may be protected, for example, by a client PIN code. The mobile application may enforce the PIN code quality to a certain degree, such as requiring the user to avoid using the phone number or repeated digits as a PIN code.

In further aspects of embodiments of the invention, when the mobile user seeks to make an online authentication, the bank application may prompt a random character string. The random character string may be any number of characters, but four to five characters may be an ultimate tradeoff between security strength and user experience. A combination of the mobile user ID and the random character string may be referred to as a "challenge string". The mobile user may use the client PIN code to unlock the mobile application and enter the challenge string to the mobile application. The mobile application may encrypt the challenge string with the uniquely assigned 128-bit symmetric key and may further hash the encrypted result to eight characters using a 32-bit hashing algorithm. The hashed output may be a one-time password for the mobile user's authentication to the banking application.

In additional aspects of embodiments of the invention, the mobile user may enter the mobile user's ID in an ID field of the online application, and may also enter the one-time password in the password field. The bank application may receive the mobile user's ID and the one-time password consisting of the encrypted, hashed challenge string which was prompted by the banking application on the logon page. Based on the mobile user's ID, the bank application may encrypt the challenge string with the unique symmetric key assigned to that particular ID and may perform the same 32-bit hash. The banking application may then compare the banking application's hashing result with the response that was generated by the user's mobile application. If the two match, the mobile user's authentication with the multifactor authentication is successful.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 7 is a table showing examples of one-time passwords generated using a four-character random character string, 128-bit AES encryption, and short hash result using an Adler hash function for embodiments of the invention;

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Figure 1:
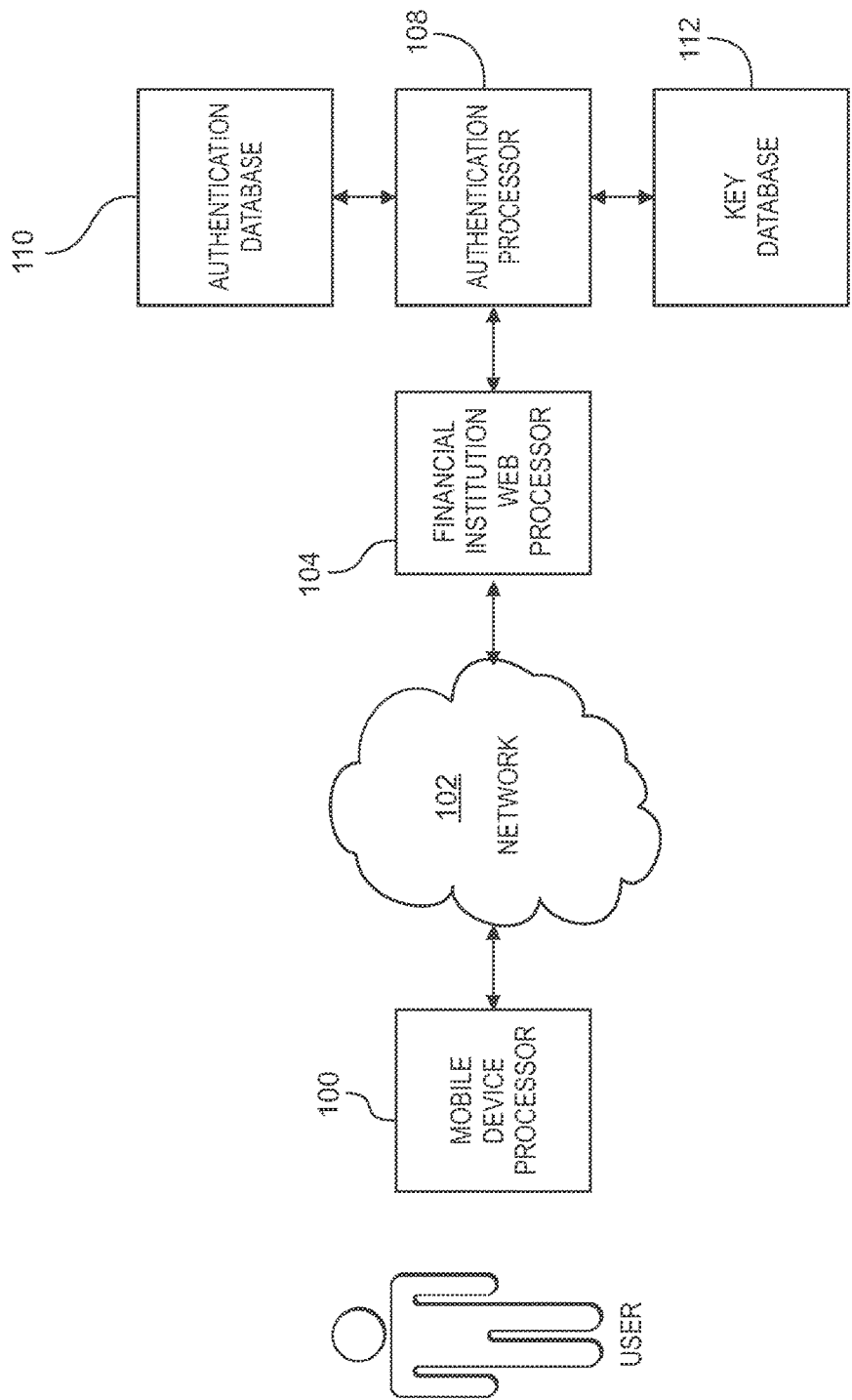
FIG. 1 is a schematic diagram that illustrates an overview example of key components and the flow of information between key components for embodiments of the invention.

Embodiments of the invention provide methods and systems for strong authentication using dynamic password authentication that employ, for example, an authentication server architecture, a function flow on the server system, and a function flow using a mobile device for dynamic password-based authentication. FIG. 1 is a schematic diagram that illustrates an example of key components and the flow of information between key components for embodiments of the invention. Referring to FIG. 1, embodiments of the invention may include, for example, an application on a user's mobile device processor 100 in communication over a network 102 with a mobile platform processor 104, for example, of a financial institution such as a bank. It is to be understood that the device processor 100 may comprise a processor of an end user computing device that connects to the network 102 or a mobile device that is capable of operating off-line once activated.

Referring further to FIG. 1, the mobile platform processor 104 may in turn be in communication with an authentication server processor 108 of the financial institution. Both the authentication server processor 108 and the mobile application on the mobile device processor 100 may utilize a symmetric encryption key that is known only to the authentication server processor 108. Such encryption key may be used to generate a one-time password to achieve second factor authentication for meeting the FFIEC guidance previously referenced herein. With this approach, the authentication parameters may be a standard user ID and password plus the proven ownership of the mobile application on the mobile device processor 100 which may have the unique symmetric key that is known only to the bank. It is to be further understood that the user ID may include any unique sequence of characters by which the user may be identified and may comprise, for example, a mobile device number, which can be programmatically available.

Embodiments of the invention may utilize a one-time password generated by a combination of a random string, a user ID, and the unique symmetric encryption key on the mobile application on the mobile device processor 100 as a second authentication factor when a user is authenticating to the online application processor 104. Because the user ID is always unique, when it is combined with the random string generated by the authentication server processor 108, it forms a challenge string that is unique to each user on each occasion. When the randomly generated string is encrypted by the symmetric key on the mobile application on the user's mobile device processor 100 that was uniquely assigned to the user by the authentication server 108, the encrypted result is unique and is predictable by the authentication server processor 108.

In embodiments of the invention, the encrypted result may be too long to be entered into an authentication screen displayed on the user's mobile device by the user as a practical matter. Therefore the encrypted result may be further hashed to a lesser number of characters, such as eight characters, for easier entry. The hash function produces a consistent result for the same input string, and the randomly generated string changes on each connection for each user. Thus, the hashed result is unique for each connection and consequently comprises a unique one-time password. The random character string is the input event to the mobile application and hence is event-based but not predictable. When a user submits the combination of a user ID, a static password, and the hashed result from the challenge string, the authentication server processor 108 may perform a number of functions to authenticate the user's identity.

For example, the authentication server processor 108 may compare the user's password with a password for the user stored in an authentication database 110 corresponding to the user ID provided. In addition, the authentication server processor 108 may combine the randomly generated character string with which it prompted the user to form a cipher input string. Further, the authentication server processor 108 may retrieve the user's symmetric key in a key database 112 corresponding to the user ID provided. The authentication server processor 108 may then encrypt the cipher input with the retrieved symmetric key and use the same hash function to hash the encrypted result. Finally, the authentication server processor 108 may compare the resulting hash to the hash that comprises the one-time password that was entered by the user on the authentication page displayed on the user's mobile device. If the two are identical, the user's authentication is a success. Otherwise, the authentication is a failure.

Figure 2:
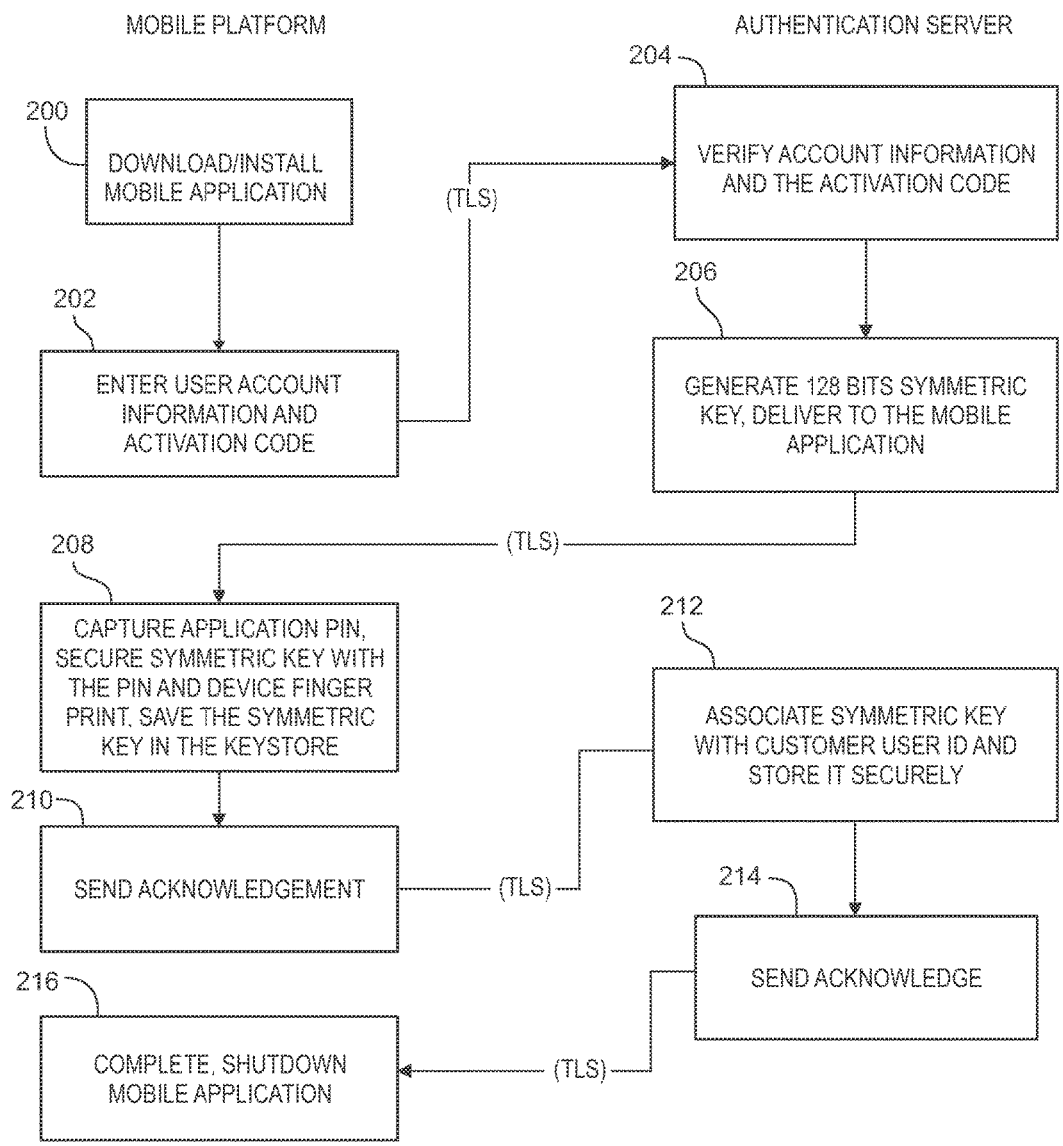
FIG. 2 is a flow chart that illustrates an example of the activation function process for embodiments of the invention.

FIG. 2 is a flow chart that illustrates an example of the activation function process for embodiments of the invention. Referring to FIGS. 1 and 2, at 200, a user may log on to a bank's website processor 104 to download the mobile multi-factor authentication (MFA) application for embodiments of the invention and install it in the user's mobile device processor 100. Each user who downloads the mobile MFA application may receive a uniquely assigned activation code which is associated with user's account number by the bank authentication server processor 108. The activation code may be delivered by a separate channel, such as secure email. The user may retrieve the activation code from a web site processor 104 after receiving the email notification. Alternatively, the user may receive the activation code via postal service mail. The user may download and install the mobile application for mobile authentication on the user's mobile device processor 100.

Referring further to FIGS. 1 and 2, at 202, the user may enter the user's account information such as a partial account number, the user's name, the user's zip code, etc., on the user's mobile device 100 as proof of the user's identity, and the activation code may be received by the user from the authentication server processor 108. The information entered by the user may be transmitted to the authentication server processor via a secured, encrypted channel such as Secure Sockets Layer (SSL) or Transport Layer Security (TLS). At 204, the authentication server processor 108 may verify the information provided by the user, including the account information and the activation code. If the information provided by the user matches information stored in the bank's database 110, at 206, the authentication server processor 108 may generate a 128-bit encryption key and deliver it to the user's mobile application 100 as a part of a reply message. The message may be delivered via the secured encrypted channel such as TLS.

Referring again to FIGS. 1 and 2, at 208, the user's mobile application 100 may prompt the user to enter a PIN code that is required each time the user runs the mobile application. The mobile application 100 may also collect a device fingerprint of the user's mobile device, such as the International Mobile Subscriber Identity (IMSI) number of the mobile device. The mobile application 100 may combine the IMSI number with the PIN code to form a symmetric key to encrypt the symmetric key received from the authentication server processor 108. The encrypted result may be stored in a mobile device key store on the mobile device 100. At 210, the mobile application 100 may generate an acknowledgement message to confirm a successful activation and securely store the symmetric key.

Referring once more to FIGS. 1 and 2, the acknowledgement message may be transmitted over a securely encrypted channel such as TLS to the authentication server processor 108. At 212, the authentication server processor 108 may associate and store the symmetric key and the account number in a secure data store 112 and destroy the activation code. At 214, the authentication server processor 108 may send an acknowledgement over a securely encrypted channel such as TLS to the mobile application 100 for completion of activation. At 216, upon receiving the acknowledgement from the authentication server processor 108, the mobile application 100 may prompt the user with a message that activation has been completed and shut down. Since the mobile application 100 has a capability to receive a symmetric key assigned from the authentication server processor 108, the bank's processor 104 may update the mobile application with new symmetric keys as needed.

Figure 3A:
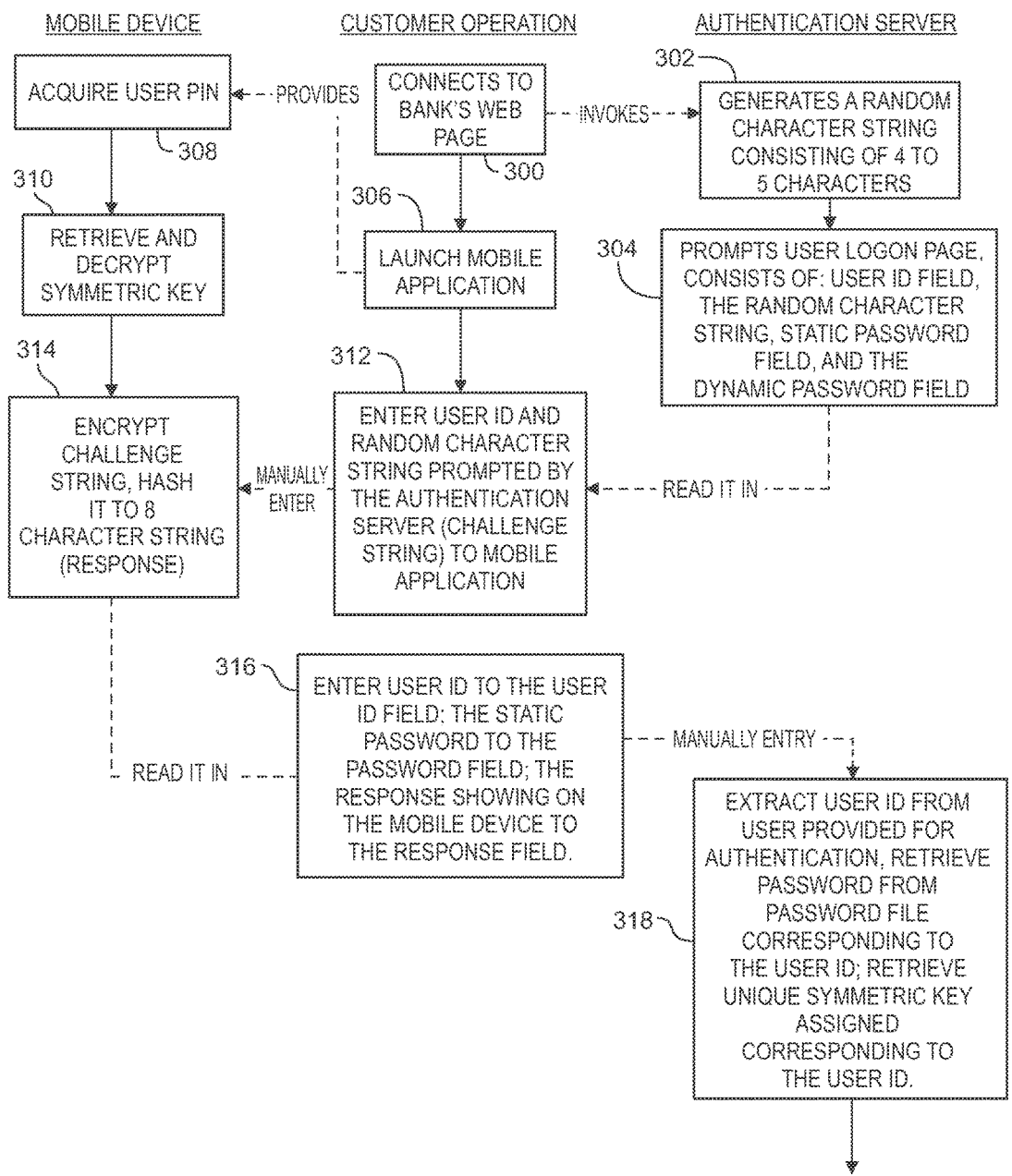
FIGS. 3A and 3B show a flow chart that illustrates an example of the authentication function process for embodiments of the invention.
Figure 3B:
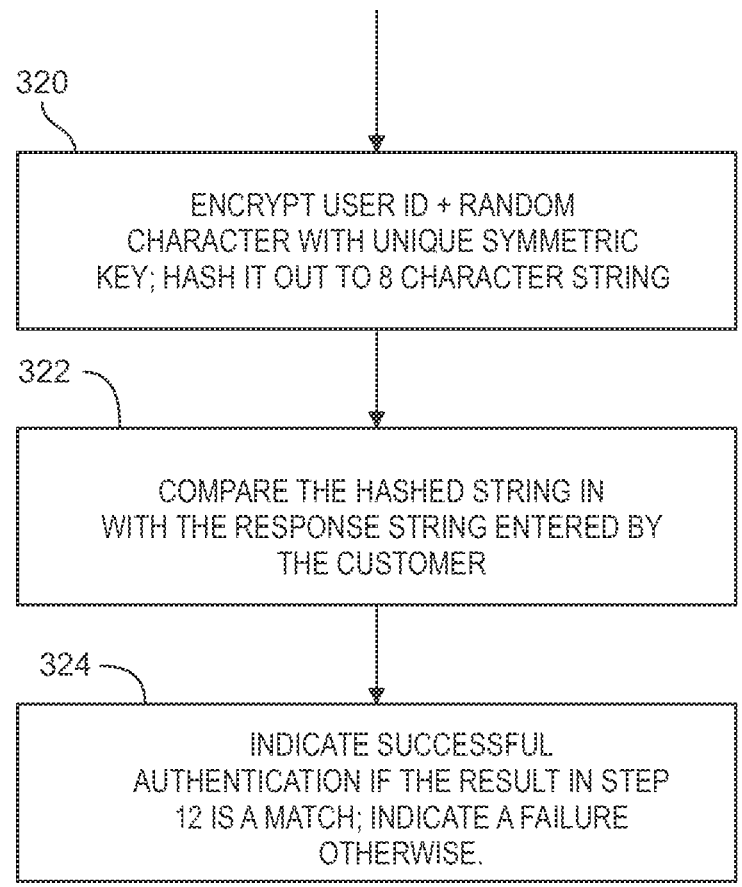

FIGS. 3A and 3B show a flow chart that illustrates an example of the authentication function process for embodiments of the invention. Referring to FIGS. 1 and 3A, when a user logs on to a banking web page 104, at 300, the bank's web application 104 that controls the web page may invoke the authentication server processor 108 to authenticate the user. At 302, the authentication server processor 108 may first create a random character string of four to five characters in length. At 304, the authentication server processor 108 may then present a logon page to the user on the display of the user's mobile device 100, which may have, for example, bank business information and disclaimers along with additional fields. One such additional field may be a user ID field for the user to enter the user's logon user ID. Another such field may be a random character string field. An additional such field may be a password field for the user to enter a static password. A further such field may be a response field for the user to enter a one-time password calculated by the user's mobile application.

Referring again to FIGS. 1 and 3A, at 306, the user may then launch the user's mobile application 100 and enter a PIN code required by the mobile application for security purposes. At 308, the mobile application 100 may accept the user's PIN code. At 310, the mobile application 100 may retrieve the encrypted symmetric key from the key store of the user's mobile device and decrypt it with the combination of the PIN code and the fingerprint of the user's mobile device to unveil the symmetric key. At 312, the user may enter the user's user ID and the random character string that was presented for the user in the logon page to the mobile application 100. At 314, the mobile application 100 may encrypt the challenge string and hash the encrypted result to generate an eight character one-time password that may also be referred to as a response string. At 316, the user may enter the user's user ID, the user's static password, and the response string or one-time password to the logon page on the user's mobile device 100. At 318, the authentication server processor 108 may extract the user ID, retrieve the user password from a password database, and compare the password in the record with the password entered by the user. Should the entered and retrieved passwords match, the authentication server processor 108 may further retrieve the symmetric key corresponding to the user ID.

Referring to FIGS. 1 and 3B, at 320, the authentication server processor 108 may encrypt the user ID and random character string that was previously prompted to the user on the user's mobile device 100 with the symmetric key. The authentication server processor 108 may also hash the encrypted result with the same hash algorithm that was used in the mobile application 100 to hash the response string received from the user. At 322, the authentication server processor 108 may compare the hashed result with the response string entered by the user on the user's mobile device 100. At 324, if the two match, the authentication server processor 108 may indicate a successful user authentication to the banking application 104. Otherwise the authentication server processor 108 may indicate an authentication failure to the banking application 104.

A mobile device is inherently insecure, for example, because such devices are easily misplaced or lost. However, in order for an unauthorized person in possession of the user's mobile device to impersonate a user, for example, in a banking transaction, embodiments of the invention require the unauthorized person to know many things. For example, the unauthorized person must know the user's banking user ID, the user's mobile PIN, the user's mobile application PIN, and the user's banking password if the bank implementation uses a traditional password as a part of the authentication factors. Further, communication from the user's browser to the banking application may be protected by TLS or SSL.

Since the challenge string for embodiments of the invention is randomly generated each time in each session, with the combination of user ID, the challenge string is unique for each user each time. Thus, any possibility of successful guessing by an unauthorized person is removed. Further, because the encryption key is unique to each mobile application, an unauthorized person can attack only one account at a time by collecting the symmetric key, for example, by physically possessing a user's mobile device. In addition, banking applications typically implement an excessive logon failure lockout feature, so that an account is locked out after a predefined number of failed logon attempts. This limits the number of tries an unauthorized person can make in attacking a single account. Still further, in embodiments of the invention, the short, hashed output is used only once and does not function as a message digest. Therefore, there is no reason for concern about an occurrence of a collision, in the sense that it is possible for more than one person to have the same password by coincidence. The randomness of the short hash has a collision chance of less than one in multiple millions, and therefore guessing the one-time password response string for embodiments of the invention is not a concern.

Figure 4:
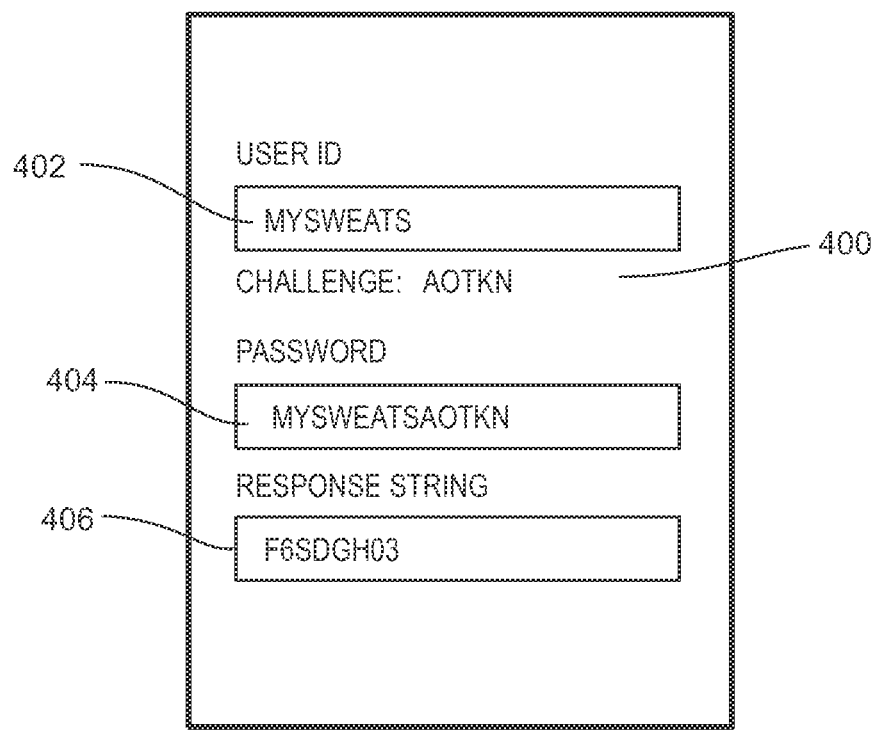
FIG. 4 is an example of a graphical user interface partial display of a logon page for embodiments of the invention.

FIG. 4 is an example of a graphical user interface partial display of a logon page for embodiments of the invention.

Referring to FIGS. 1 and 4, when a user is making an online authentication, the bank authentication application 108 may prompt a random character string 400. The random character string 400 may be any number of characters, but four to five characters may be an ultimate tradeoff between security strength and user experience. The combination of user ID 402 and random character string 400 is the challenge string 404. The user may use his or her PIN code to unlock the mobile application 100 and enter the challenge string 404 to the mobile application. The mobile application 100 may encrypt the challenge string 404 with a uniquely assigned 128-bit symmetric key.

Referring further to FIGS. 1 and 4, the mobile application 100 may use a short hash function of 32 to 40 bits to hash the encrypted result and generate a response string 406 of eight to ten characters. The hashed output is a one-time password 406, since it changes every time as the random character string 400 is provided by the authentication server processor 108 changes. Therefore, it is event based and dynamic. The user may enter his or her user ID 402 in the ID field of the online application, a traditional static password in the password field, and the dynamic one-time password in a second password field. Alternatively, the bank application may skip the traditional static password field to omit inherent password issues, such as entry of an incorrect password and potentially causing the account to lock up. That is made possible because the dynamic password authentication greatly exceeds the strength of the static password and therefore an additional static password does not provide any significant additional security measure.

Referring again to FIG. 1, the authentication server processor may receive the user's user ID 402 and the challenge string 404 which was a combination of the random character string 400 prompted by the bank application on the logon page and the user's user ID 402. The authentication server processor 108 may retrieve the user's unique symmetric key from the key database 112 based on the user's user ID and encrypt the challenge string with the unique symmetric key assigned to that particular user ID. The authentication server processor 108 may then perform the identical short hash function using the same method, such as Adler32, JAVA hashCode( ), Bernstein hash, mumurhash, etc., as used by the mobile application 100. The authentication server processor 108 may compare the hashing result with the response generated by the user's mobile application 100. If the two hashing results match, a successful multifactor authentication has been performed.

Figure 5:
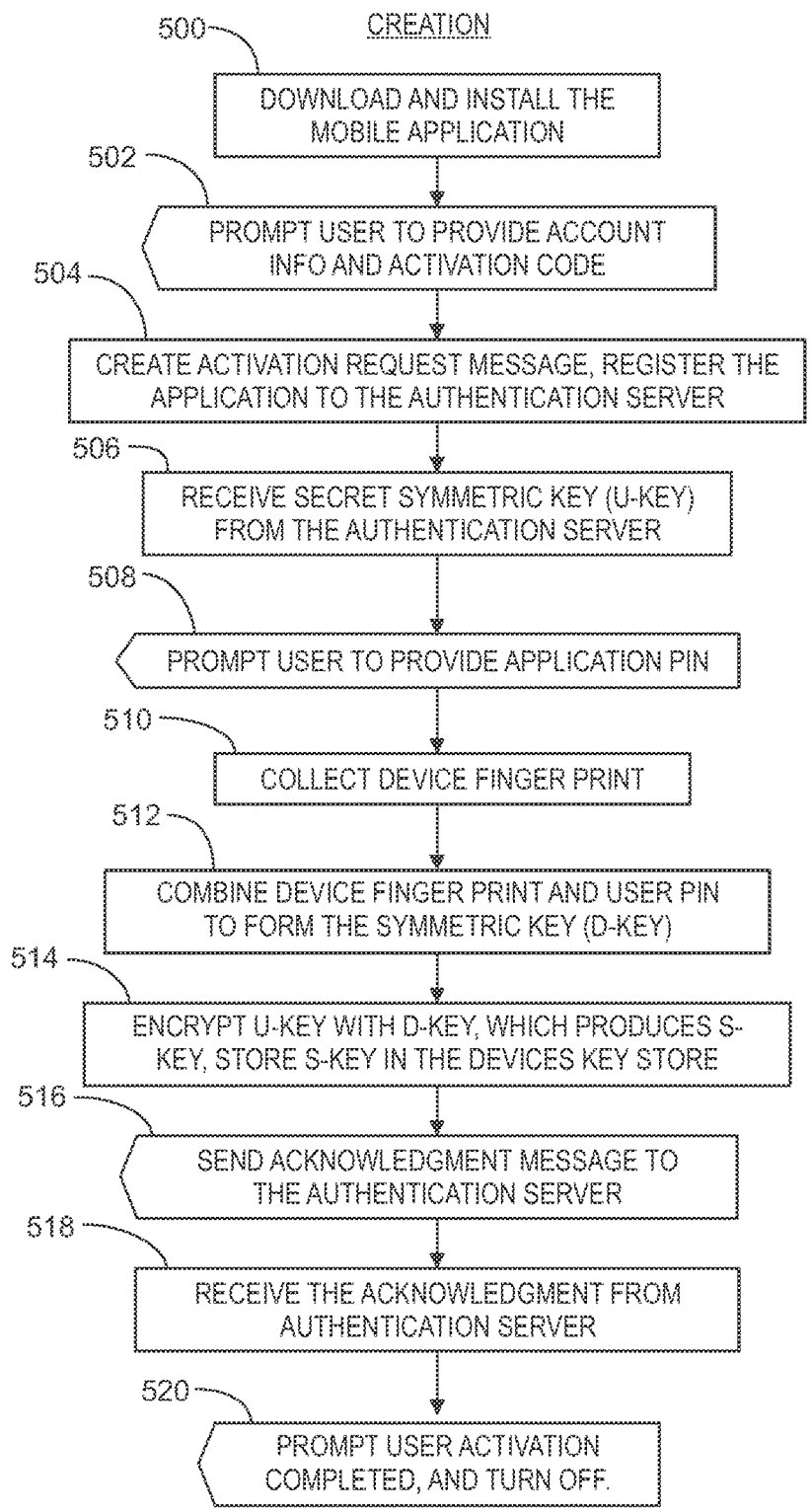
FIG. 5 is a flow chart that illustrates another example of the mobile application creation process for embodiments of the invention.

FIG. 5 is a flow chart that illustrates another example of the mobile application creation process for embodiments of the invention. Referring to FIGS. 1 and 5, a user who is an account owner may first receive an activation code from a bank. The activation code may be received by one of several different channels. For example, the user may make a request online at the bank's website; the user may receive the activation code via telephone from a bank representative; or the user may receive the activation code by postal service delivery. At 500, with the activation code in hand, the mobile user may download and install the application from a trusted source onto the user's mobile device processor 100. Upon completion of the installation, at 502, the mobile application 100 may prompt the user to provide account related information, such as the last few digits of the user's account number, the user's zip code, the user's name, etc., and the activation code.

Referring again to FIGS. 1 and 5, at 504, the mobile application 100 may create an activation request message and send the message to the bank authentication application 108 to properly identify the mobile device owner and verify the corresponding activation code. Once the user account information and the activation code are identified and verified, the bank application 108 may randomly generate a unique symmetric key and send the unique symmetric key (hereinafter "U-key") to the mobile application 100 via a secured channel. Upon receiving the U-key by the mobile application 100, at 506, the mobile application 100 may require the user to provide an application PIN code to secure the symmetric key from accidental disclosure. Therefore, at 508, the mobile application 100 may prompt the user to provide an application security PIN. At 510, the mobile application 100 may also collect device specific information, such as the IMSI or CPU identifier of the mobile device.

Referring once more to FIGS. 1 and 5, at 512, the device specific information and the user provided application PIN may be used by the mobile application 100 as entropy (randomness) values to create a device specific encryption key (hereinafter "D-key"). At 514, the mobile application 100 may encrypt the U-key with the D-key and store the result (hereinafter "S-key") in the key store of the mobile device. At 516, the mobile application 100 may send an acknowledgement message to the bank application 108 indicating that the installation is completed. At 518, the bank application 108 may send an acknowledgement message back to the mobile application 100 as confirmation. At 520, the mobile application 100 may inform the user that registration/activation has been completed and turn itself off.

Figure 6:
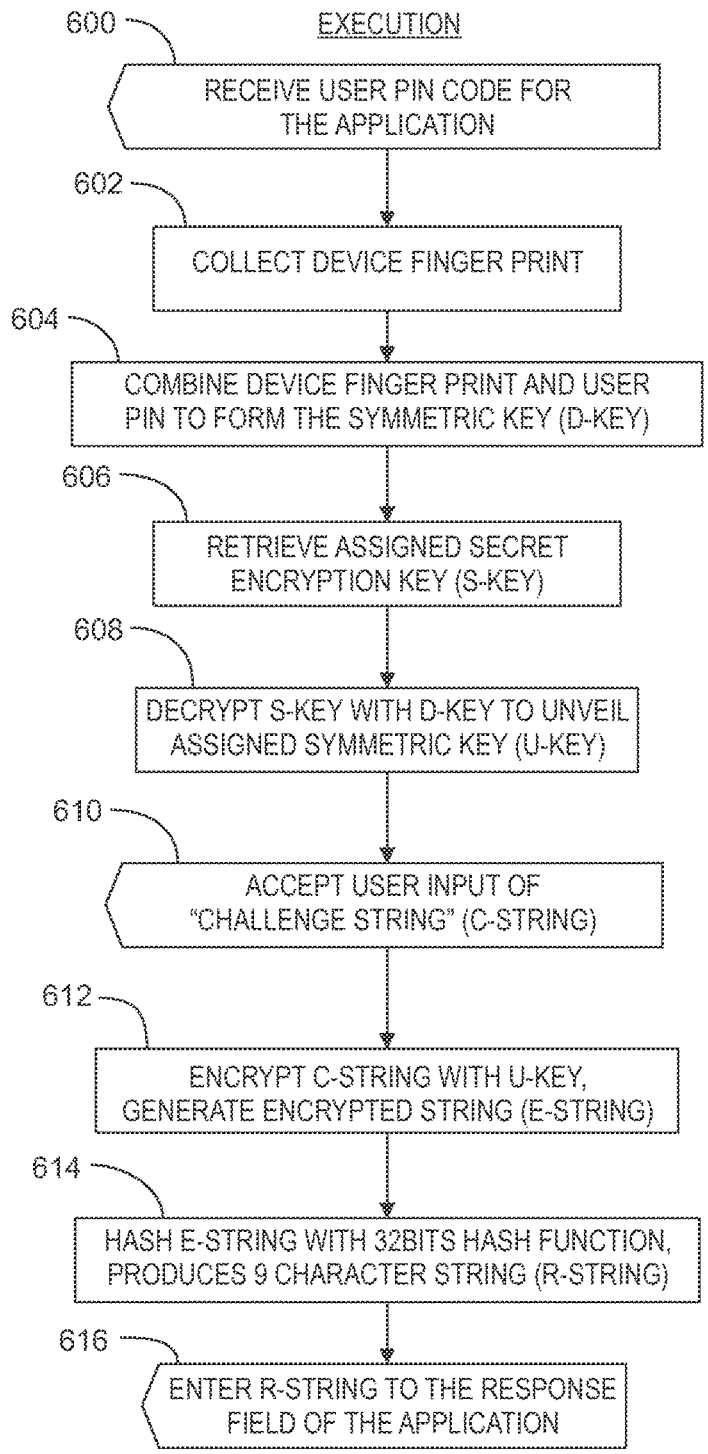
FIG. 6 is a flow chart that illustrates another example of the mobile application execution process for embodiments of the invention.

FIG. 6 is a flow chart that illustrates another example of the mobile application execution process for embodiments of the invention. Referring to FIGS. 1 and 6, in the execution process, when the user accesses the mobile application 100, at 600, the mobile application 100 may prompt the user to enter the application PIN code, which is a basic security setting to assure that no one can execute the mobile application without knowledge of the PIN code. Once the PIN code is received, at 602, the mobile application 100 may also collect mobile device fingerprint information, such as the IMSI number and/or the CPU identifier of the mobile device. At 604, the PIN code and device fingerprint information may be the entropy values used to generate the device specific encryption key (D-key). At 606, the mobile application 100 may retrieve the secret key (S-key) from the key store of the mobile device and decrypt the S-key with the D-key, at 608, to unveil the unique symmetric key (U-key) assigned by the bank application 108.

Referring to FIGS. 1, 4 and 6, the mobile application 100 may prompt the user to enter the user's logon user ID 402 and the character string 400 that the bank's authentication server processor 108 prompted on the web page. At 610, the combination of user ID 402 and the randomly generated character string 400 may form the "challenge string" 404. At 612, the mobile application 100 may encrypt the challenge string 404 with the U-key, which generates a long array (hereinafter "E-string"). At 614, to make the E-string suitable for the user to enter on the webpage for authentication, the mobile application 100 may use a short hash function, such as 32-bits, to generate a short character string of eight characters. The output of the hash function may be a response string (hereinafter "R-string"). At 616, the mobile application 100 may then inform the user to enter the R-string on the response field of the application as a one-time password 406. FIG. 7 is a table showing examples of one-time passwords generated using a four-character random character string, 128-bit AES encryption, and short hash result using an Adler hash function for embodiments of the invention.

Figure 8:
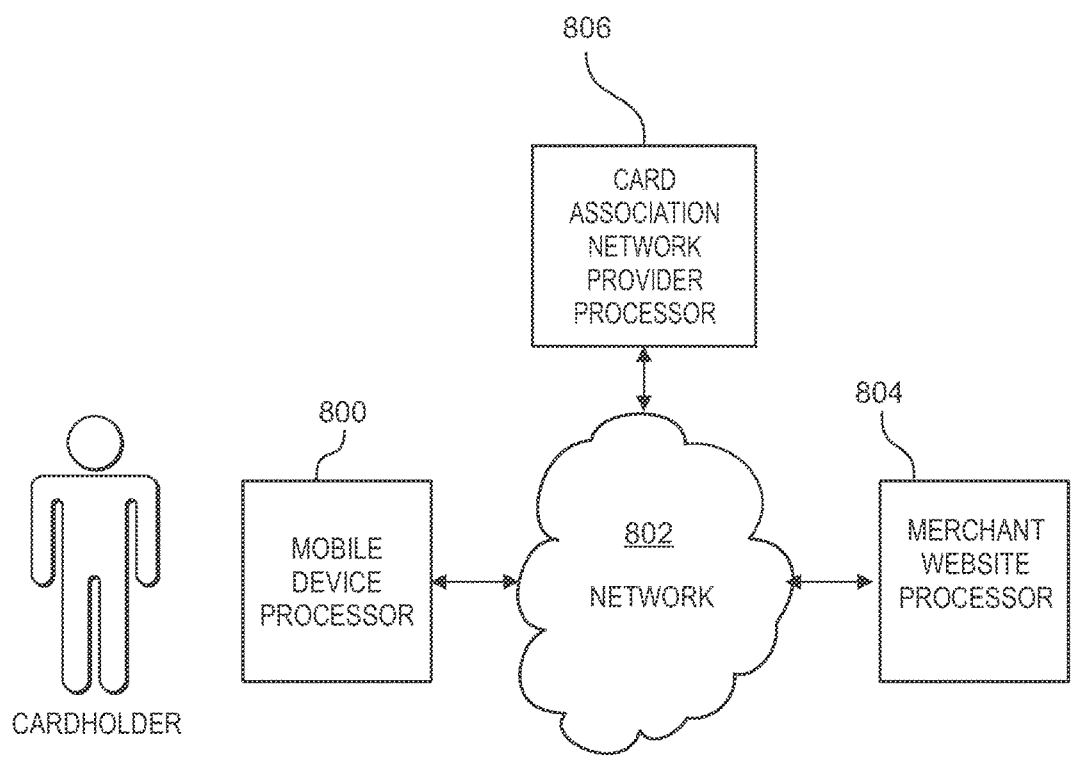
FIG. 8 is a schematic diagram that illustrates an overview example of key components and flow of information between key components for an alternative aspect of embodiments of the invention.

An alternative aspect of embodiments of the invention may provide security enhancement to a card association transaction processing network provider. Currently, certain card association network providers may have security schemes that require a cardholder to register a personal or private user ID and password. FIG. 8 is a schematic diagram that illustrates an example of key components and flow of information between key components for an alternative aspect of embodiments of the invention. Such components may include, for example, a user's mobile device processor 800 communicating via a network 802 with a merchant website processor 804 and a card association network provider processor 806. During online shopping at a checkout step, for example, the online merchant 804 may require the cardholder to log on a website of the card association network provider 806 to verify the identity of the cardholder. A problem with such security schemes is that the user ID and password have inherent security issues by relying on the "what you know" factor. For example, cardholders are faced with a tradeoff between use of a strong, secure password and a weak, easy-to-remember password. Further, user IDs and passwords are easily forgotten, and repetitive use of the same passwords creates significant security issues.

Figure 9:
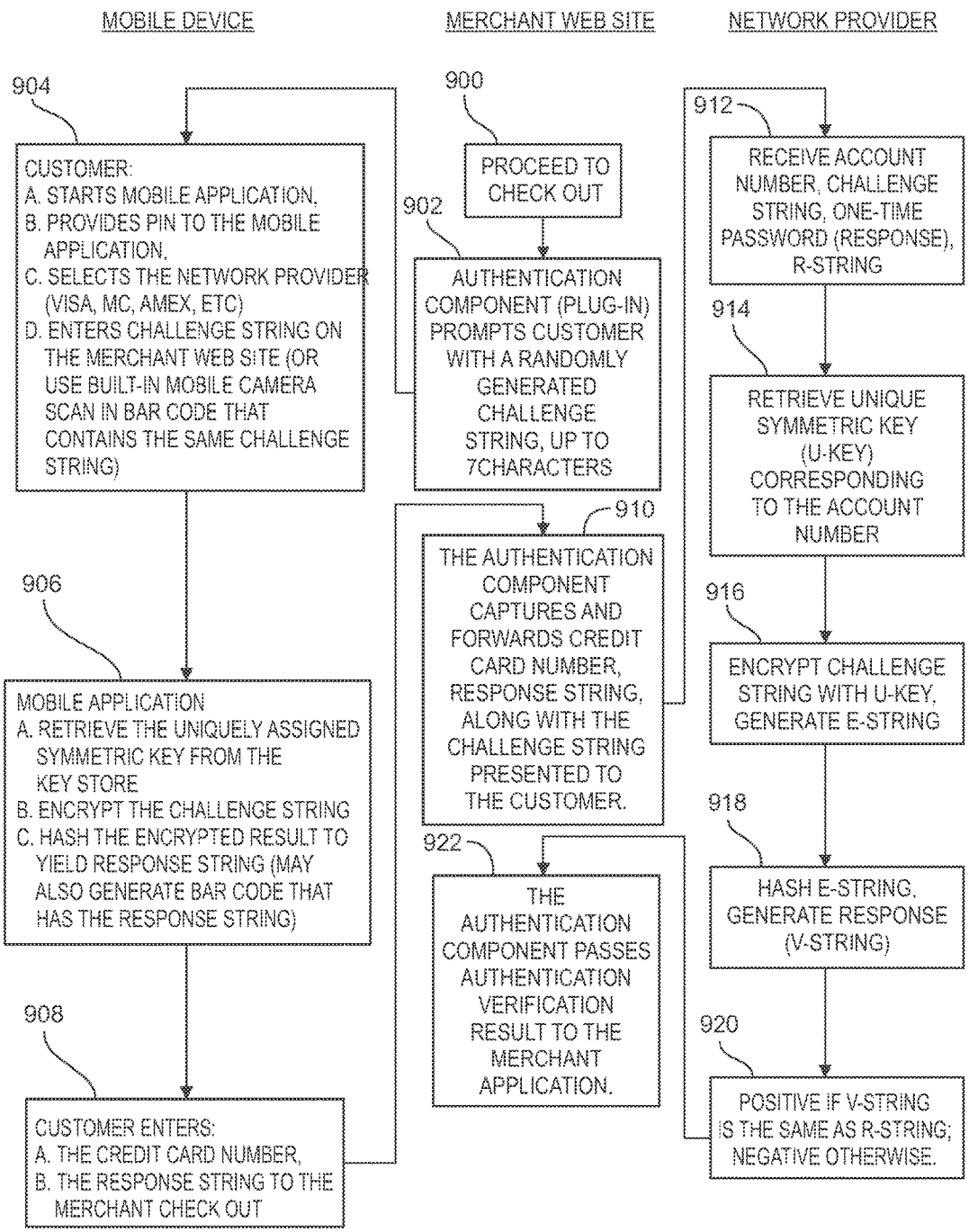
FIG. 9 is a flow chart that shows an example of the authentication function process in the alternative aspect of embodiments of the invention.

The alternative aspect proposes use of the mobile-based one-time password method and system for embodiments of the invention by card association network providers. For example, a card association network provider 806 may share the mobile application 100 for embodiments of the invention. The network card association provider 806 may assign a unique symmetric key to the card owner upon completion of the activation/registration. In the alternative aspect, the unique symmetric key (U-key) may be known only to the card association network provider 806. FIG. 9 is a flow chart that shows an example of the authentication function process in the alternative aspect of embodiments of the invention. Referring to FIGS. 8 and 9, during online checkout at 900, the merchant website 804 may simply invoke an embedded authentication component ("AC") provided by the network card association provider 806. At 902, the AC may then generate a random character string. In the alternative aspect, the random character string may be, for example, seven to ten characters in length to assure sufficient randomness. In the alternative aspect, the random character string, which is the challenge string, may be in text format or in barcode format.

Referring further to FIGS. 8 and 9, at 904, the cardholder may select the network card association provider on the mobile application 800 and manually enter the challenge string or scan the barcode if provided in barcode format. At 906, the mobile application 800 may encrypt the challenge string with the unique symmetric key assigned by the network card association provider 806 and hash the encrypted result to produce a response string. At 908, the cardholder may then enter his or her credit card number and the response string shown on the mobile application 800 to the embedded AC. At 910, the embedded AC may forward the credit card number and the challenge string, which it previously generated, to the network card association provider 806 for verification. At 912-920, the verification result may be either "positive" or "negative" to indicate the success or failure, respectively, of verifying the cardholder.

Figure 10:
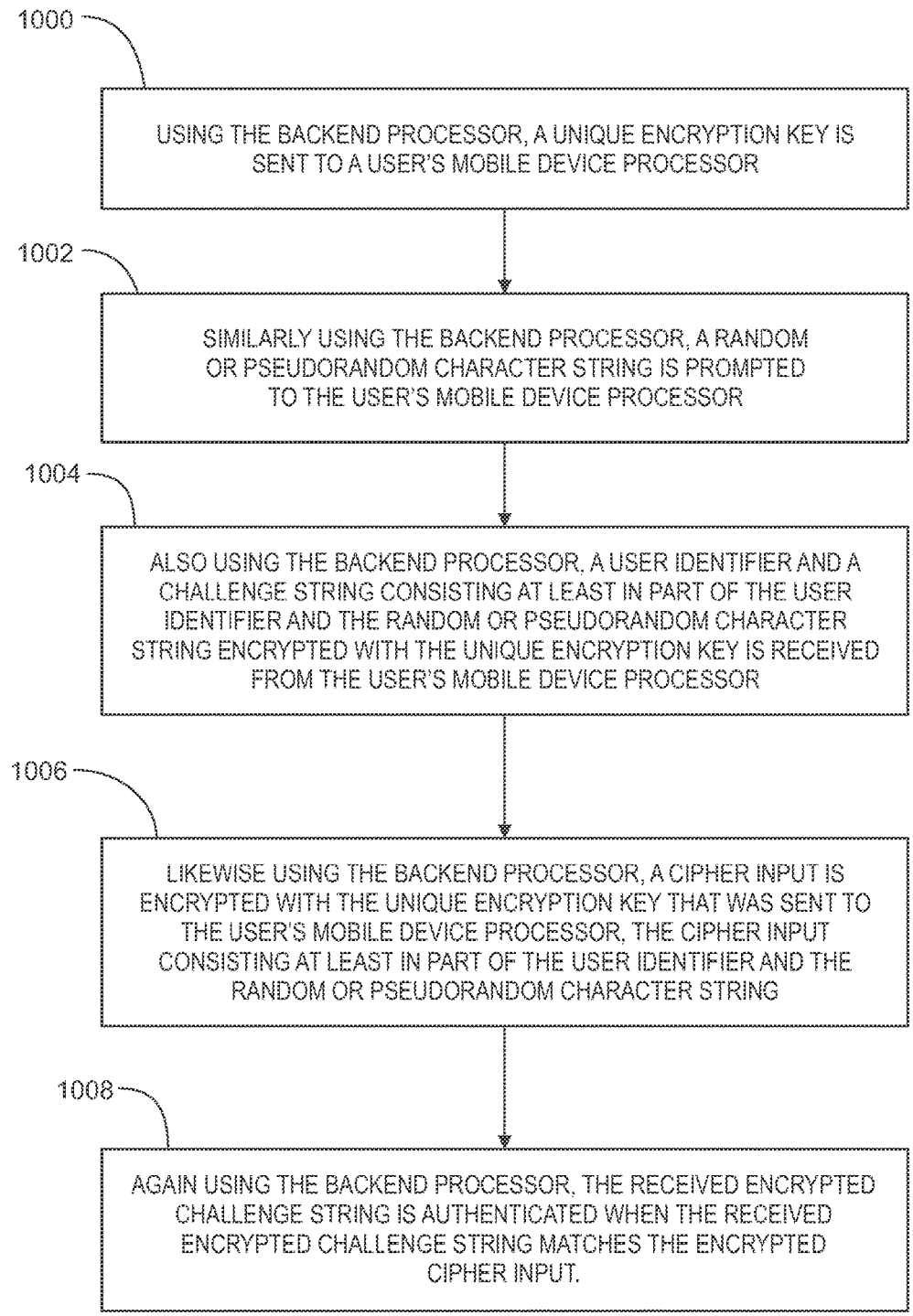
FIG. 10 is a flow chart that illustrates another example of the process of performing an electronic transaction using dynamic password authentication for embodiments of the invention.

FIG. 10 is a flow chart that illustrates another example of the process of performing an electronic transaction using dynamic password authentication for embodiments of the invention. Referring to FIG. 10, at 1000, using a backend processor, a unique encryption key is sent to a user's mobile device processor. At 1002, similarly using the backend processor, a random or pseudorandom character string is prompted to the user's mobile device processor. At 1004, also using the backend processor, a user identifier and a challenge string consisting at least in part of the user identifier and the random or pseudorandom character string encrypted with the unique encryption key is received from the user's mobile device processor. At 1006, likewise using the backend processor, a cipher input is encrypted with the unique encryption key that was sent to the user's mobile device processor, the cipher input consisting at least in part of the user identifier and the random or pseudorandom character string. At 1008, again using the backend processor, the received encrypted challenge string is authenticated when the received encrypted challenge string matches the encrypted cipher input.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a Wide Area Network (WAN), a Local Area Network (LAN), a cellular network, or any other suitable network. Embodiments of the invention may employ client devices that may each comprise a computer-readable medium, including but not limited to, Random Access Memory (RAM) coupled to a processor. The processor may execute computer-executable program instructions stored in memory. Such processors may include, but are not limited to, a microprocessor, an Application Specific Integrated Circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a RAM. Such server devices, which may be a single computer system, may also be implemented as a network of computer processors. Examples of such server devices are servers, mainframe computers, networked computers, a processor-based device, and similar types of systems and devices.

What is claimed is:

1. A method for performing electronic transactions using dynamic password authentication, comprising:
   sending, using a backend processor, a unique random or pseudorandom character string to a user's mobile device processor;
   generating, by the mobile device processor, a one-time password comprising a hash, according to a predefined short hash function, of an encrypted challenge string consisting at least in part of the user identifier and the random or pseudorandom character string encrypted with a unique encryption key;
   prompting, by the backend processor, entry of the one-time password on a password field of an end user computing device in online communication with the backend processor;
   receiving, using the backend processor, a user identifier and the user-entered one-time password comprising the hash, according the predefined short hash function, of the encrypted challenge string consisting at least in part of the user identifier and the random or pseudorandom character string encrypted with the unique encryption key from a processor of the end user computing device;
   encrypting, using the backend processor, a cipher input with the unique encryption key, the cipher input consisting at least in part of the user identifier and the random or pseudorandom character string;
   generating, by the backend processor, a hash of the encrypted cipher input according to the predefined short hash function; and
   authenticating, using the backend processor, the received hash of the encrypted challenge string when the received hash of the encrypted challenge string matches the hash of the encrypted cipher input.

2. The method of claim 1, further comprising sending the unique encryption key to a mobile application installed on the user's mobile device.

3. The method of claim 2, wherein sending the unique encryption key to the mobile application further comprises registering the mobile application with the backend processor.

4. The method of claim 3, wherein registering the mobile application further comprises verifying an activation code received by the backend processor from the mobile device processor.

5. The method of claim 4, wherein registering the mobile application further comprises verifying user account information and the activation code received by the backend processor from the mobile device processor.

6. The method of claim 2, wherein sending the unique encryption key to the mobile application on the user's mobile device processor further comprises sending a unique symmetric encryption key to the mobile application.

7. The method of claim 2, wherein sending the unique encryption key to the mobile application on the user's mobile device processor further comprises storing the unique encryption key in a key store of the user's mobile device.

8. The method of claim 2, wherein sending the unique encryption key to the mobile application on the user's mobile device processor further comprises storing the unique encryption key in a key database by the backend processor.

9. The method of claim 8, wherein storing the unique encryption key by the backend processor further comprises associating the unique encryption key with the user identifier.

10. The method of claim 1, wherein sending the random or pseudorandom character string further comprises sending the random or pseudorandom character string of less than eight characters to the user's mobile device processor.

11. The method of claim 1, wherein sending the random or pseudorandom character string further comprises sending the random or pseudorandom character string in response to a user's logon request.

12. The method of claim 1, wherein receiving the user identifier and the user-entered one-time password comprising the hash, according to the predefined short hash function, of the encrypted challenge string further comprises receiving a user PIN code and the one-time user-entered password comprising the hash, according to a predefined short hash function, of the encrypted challenge string consisting at least in part of the user PIN code and the random or pseudorandom character string encrypted with the unique encryption key from the processor of the end user computing device.

13. The method of claim 1, wherein receiving the user identifier and the user-entered one-time password comprising the hash, according to the predefined short hash function, of the encrypted challenge string further comprises receiving the user identifier and the user-entered one-time user password consisting of a hash of a pre-determined number of characters.

14. The method of claim 13, wherein receiving the user identifier and the user-entered one-time user password consisting of the hash of the pre-determined number of characters further comprises receiving the user identifier and the user-entered one-time user password consisting of the hash of a pre-determined number of characters that is not greater than eight characters.

15. The method of claim 1, wherein encrypting the cipher input further comprises retrieving the unique encryption key corresponding to the received user identifier from a key database by the backend processor.

16. The method of claim 1, wherein generating the hash of the encrypted cipher input further comprises generating the hash, according to the predefined short hash function, of the encrypted cipher input consisting at least in part of a user PIN code and the random or pseudorandom character string sent to the user's mobile device processor.

17. The method of claim 1, wherein authenticating the received hash of the encrypted challenge string further comprises comparing the received hash of the encrypted challenge string with the hash of the encrypted cipher input.

18. The method of claim 1, further comprising sending, on a succeeding occasion, a different random or pseudorandom character string to the user's mobile device processor.

19. A system for performing electronic transactions using dynamic password authentication, comprising:
   a backend server microprocessor coupled to memory and programmed to:
      send a unique random or pseudorandom character string to a user's mobile device microprocessor coupled to memory;
   the user's mobile device memory-coupled microprocessor being programmed to:
      generate a one-time password comprising a hash, according to a predefined short hash function, of an encrypted challenge string consisting at least in part of the user identifier and the random or pseudorandom character string encrypted with a unique encryption key;

the backend server memory-coupled microprocessor being further programmed to:

prompt entry of the one-time password on a password field of an end user computing device in online communication with the backend memory-coupled microprocessor;

receive a user identifier and a user-entered one-time password comprising the hash, according to a predefined short hash function, of an encrypted challenge string consisting at least in part of the user identifier and the random or pseudorandom character string encrypted with the unique encryption key from a memory-coupled microprocessor of the end user computing device;

encrypt a cipher input with the unique encryption key sent to the user's mobile device memory-coupled microprocessor, the cipher input consisting at least in part of the user identifier and the random or pseudorandom character string;

generate a hash of the encrypted cipher input according to the predefined short hash function; and authenticate the received hash of the encrypted challenge string when the received hash of the encrypted challenge string matches the hash of the encrypted cipher input.

\* \* \* \* \*